(12) United States Patent
Kanai et al.

(10) Patent No.: US 6,483,674 B1
(45) Date of Patent: Nov. 19, 2002

(54) SPIN VALVE HEAD, PRODUCTION PROCESS THEREOF AND MAGNETIC DISK DEVICE

(75) Inventors: Hitoshi Kanai; Junichi Ito, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 22 days.

(21) Appl. No.: 09/707,179

(22) Filed: Nov. 6, 2000

(30) Foreign Application Priority Data

Jun. 6, 2000 (JP) ....................................... 2000-169346

(51) Int. Cl.[7] .............................................. G11B 5/127
(52) U.S. Cl. .................................................. 360/324.12
(58) Field of Search ....................... 360/324.11, 324.12; 428/693; 148/108

(56) References Cited

U.S. PATENT DOCUMENTS

| | | | | |
|---|---|---|---|---|
| 5,648,885 A | * | 7/1997 | Nishioka et al. | |
| 6,034,845 A | * | 3/2000 | Nagasaka et al. | |
| 6,120,920 A | * | 9/2000 | Takada et al. | 428/693 |
| 6,122,151 A | * | 9/2000 | Saito et al. | 360/324.12 |
| 6,128,167 A | * | 10/2000 | Saito et al. | 360/324.12 |
| 6,327,121 B1 | * | 12/2001 | Nagasawa et al. | 360/324.11 |
| 6,355,115 B1 | * | 3/2002 | Nagasaka et al. | 148/108 |
| 6,364,961 B1 | * | 4/2002 | Nagasaka et al. | 148/108 |

FOREIGN PATENT DOCUMENTS

| | | |
|---|---|---|
| JP | 09097409 A | 4/1997 |
| JP | 09251619 A | 9/1997 |
| JP | 11126932 A | 5/1999 |

\* cited by examiner

*Primary Examiner*—Allen Cao
(74) *Attorney, Agent, or Firm*—Greer, Burns & Crain, Ltd.

(57) ABSTRACT

A spin valve head comprises a spin valve film comprising a regular antiferromagnetic layer, a pinned magnetic layer, an intermediate layer and a free magnetic layer; a pair of electrodes arranged at both ends of the spin valve film; and a pair of exchange bias magnetic field impressing layers arranged at both ends of the free magnetic layer of the spin valve film, wherein the exchange bias magnetic field impressing layers are made of antiferromagnetic material, and the spin valve film extends over the exchange bias magnetic field impressing layers. The spin valve head is characterized in that the abutted junction region is extended so that the occurrence of Barkhausen noise can be more effectively suppressed; and the abutted junction region is stably formed without being affected by the film formation process.

21 Claims, 5 Drawing Sheets

SPIN VALVE HEAD, PRODUCTION PROCESS THEREOF AND MAGNETIC DISK DEVICE

BACKGROUND OF THE INVENTION

1. Field of the Invention

The present invention relates to a spin valve head. More particularly, the present invention relates to a spin valve head and a method of manufacturing the spin valve head capable of converting a change in a signal magnetic field, which is provided by a magnetic recording medium, into a change in electrical resistivity by the spin valve magnetic resistance effect. Also, the present invention relates to a magnetic recording and reproducing device such as a magnetic disk device or a magnetic tape device using the above spin valve head.

2. Description of the Related Art

Recently, the size of a magnetic recording and reproducing device such as a magnetic disk device has been reduced and, further, recording has been conducted at high density. Accordingly, as a reproducing head of such a device, there is provided a reproducing head using the magnetoresistive effect by which a change in the signal magnetic field provided by a magnetic recording medium is converted into a change in electrical resistivity. This reproducing head is called MR head. Especially, a GMR head, which is one type of MR head, is receiving attention because it can generate a high output without depending upon the moving speed of the magnetic recording medium. Especially, a spin valve head utilizing the spin valve magnetoresistive effect can be relatively easily manufactured, and further a rate of change of electric resistance in a low magnetic field is higher than that of other MR heads. Therefore, the spin valve head utilizing the spin valve magnetic effect has already been put into practical use.

The spin valve head, as shown in FIG. 1 as an example, includes a magnetoresistive effect film (spin valve film) 70; a pair of electrodes 68 which electrically join to the spin valve film 70 and define a signal detecting region and allow a signal detecting current to flow in the signal detecting region; and a pair of longitudinal bias magnetic field impressing layers 67 for impressing a longitudinal bias magnetic field upon the spin valve film 70. The longitudinal bias magnetic field impressing layers 67 are commonly composed of hard thin magnetic films made of CoPt or CoPtCr. When the longitudinal bias magnetic field impressing layers 67 are arranged in portions except for the magnetism sensing section (signal detecting section) of the spin valve head 71 in such a manner that the longitudinal bias magnetic field impressing layers 67 are located on both sides of the spin valve film 70 or on the spin valve film 70 (not shown in the drawing), it is possible to suppress the occurrence of Barkhausen noise caused by the movement of a magnetic wall in the free magnetic layer, which will be explained later referring to FIG. 2, of the spin valve film 70. Therefore, it is possible to obtain a stable reproduction waveform in which no noise is caused.

As shown in FIG. 2, which is a cross-sectional view taken on line II—II in FIG. 1, the spin valve film 70 is composed of a regular antiferromagnetic layer 64, a pinned magnetic layer 63, which is also referred to as a stationary magnetic layer, a nonmagnetic intermediate layer (Cu layer) 62 and free magnetic layer 61, and these layers are laminated on the described order. When the above arrangement of lamination is adopted, an angle formed by the magnetizing directions of the two magnetic layers (free magnetic layer 61 and pinned magnetic layer 63) which are laminated via the nonmagnetic intermediate layer 62 can be adjusted. In this way, electric resistance can be changed into a desired value.

In order to provide a spin valve head in which Barkhausen noise is not generated and the fluctuation of reproduction characteristic is small, Japanese Unexamined Patent Publication (Kokai) No. 9-97409 discloses the following arrangement. The longitudinal bias magnetic field impressing layer, which has been explained above referring to FIG. 1, includes: a ferromagnetic thin film, the crystal structure of which is a body-centered cubic lattice; an underlayer film which is an amorphous ferromagnetic thin film or an antiferromagnetic thin film, the crystal structure of which is a body-centered cubic lattice; and a hard magnetic thin film formed on the underlayer film.

As proposed by Japanese Unexamined Patent Publication (Kokai) No. 9-97409, in the structure in which the hard magnetic thin film is arranged on both sides of the spin valve film, a magnetic exchange coupling is generated between the spin valve film and the hard magnetic thin film by using the ferromagnetic thin film as the underlayer of the hard magnetic thin film, which is effective as a means for suppressing the occurrence of Barkhausen noise. However, this structure is disadvantageous as follows. In this structure, the magnetic exchange coupling generated between the spin valve film and the hard magnetic thin film is limited to a portion in which both end portions of the spin valve film are tapered, that is, the magnetic exchange coupling generated between the spin valve film and the hard magnetic thin film is limited to a very small joining portion which is called "an abutted junction". A profile of this joining portion is affected by the process of formation of the spin valve film, that is, a profile of this joining portion is affected by the photolithographic method, the ion milling method or the process of forming a hard magnetic thin film. Accordingly, it is difficult to form the joining portion into the same profile without causing any fluctuation. If the profile of the joining portion fluctuates, the magnetic exchange coupling also fluctuates. Further, the hard magnetic thin film activates a bias magnetic field on the spin valve film, and the magnetic field sensitivity at both ends of the signal detecting region is deteriorated.

SUMMARY OF THE INVENTION

It is a first object of the present invention to provide a spin valve head characterized in that the abutted junction region is extended so as to cause the magnetic exchange coupling in a wider area, so that the occurrence of Barkhausen noise can be more effectively suppressed and the abutted junction region can be stably formed without being affected by the process of formation of the spin valve film or hard magnetic thin film, so that reliability of the magnetic exchange coupling can be enhanced and deterioration of the magnetic field sensitivity at both ends of the signal detecting region can be prevented.

It is a second object of the present invention to provide a method of manufacturing the above spin valve head easily without it being affected by the formation process.

It is a third object of the present invention to provide a magnetic disk device having the spin valve head of the present invention.

These objects and other objects of the present invention will be more easily understood by the following detailed explanations.

The present inventors have found that the above problems of the prior art can be solved by providing a spin valve head comprising:

a spin valve film containing a regular antiferromagnetic layer, a pinned magnetic layer, an intermediate layer and a free magnetic layer which are laminated in the above order;

a pair of electrodes arranged at both ends of the spin valve film, electrically connected with the spin valve film so as to define a signal detection region and apply a signal detection current flow to the signal detection region; and a pair of exchange bias magnetic field impressing layers arranged at both ends of the free magnetic layer of the spin valve film, magnetically exchange coupled with the free magnetic layer so as to impress an exchange bias magnetic field for controlling a magnetic domain upon the free magnetic layer, wherein the exchange bias magnetic field impressing layers are made of antiferromagnetic material, and the spin valve film extends onto the exchange bias magnetic field impressing layers.

In the spin valve head of the present invention, it is preferred that the exchange bias magnetic field impressing layer is made of antiferromagnetic material such as PtMn, PdPtMn, NiMn, CrMn, CrPtMn, RuMn, RuRhMn, IrMn, IrRhMn or IrRuMn and that the uppermost layer is covered with NiFe which is a portion of the free magnetic layer of the spin valve film.

When the spin valve head is composed as described above, the area of a portion in which the magnetic exchange coupling is caused between the spin valve film and the exchange bias magnetic field impressing layer can be remarkably increased. Therefore, fluctuation of the magnetic exchange coupling described before can be remarkably suppressed. Accordingly, controlling of the magnetic domain of the spin valve film can be more stably conducted by the exchange bias magnetic field impressing layer. Therefore, the generation of Barkhausen noise can be effectively suppressed.

When Ta or other appropriate metals are made to exist as a common underlayer between the spin valve film and the exchange bias magnetic field impressing layer, the free magnetic layer can be formed under the condition of good crystallization even in the case of the longitudinal bias under-lay type spin valve head of the present invention, that is, it is possible to form a free magnetic layer, the soft magnetic characteristic of which is excellent.

In addition to the above excellent spin valve head, the present inventors have invented a method of manufacturing the spin valve head according to the present invention and a magnetic disk device comprising the spin valve head according to the present invention.

DESCRIPTION OF THE PREFERRED EMBODIMENTS

Referring to the appended drawings, the most preferred embodiments of the spin valve head of the present invention and the magnetic disk device having the spin valve head will be explained below. In this connection, it should be noted that the following embodiments are included merely to explain the present invention and changes may be made by one skilled in the art without departing from the scope of the present invention.

Figure 1:
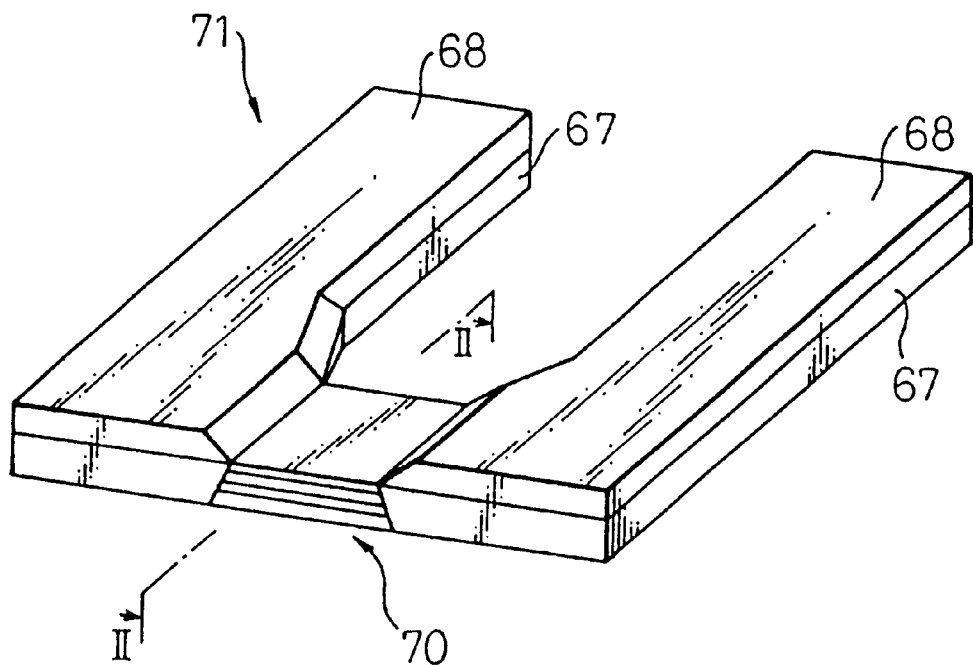
FIG. 1 is a perspective view showing a signal detecting region of a conventional spin valve head.
Figure 2:
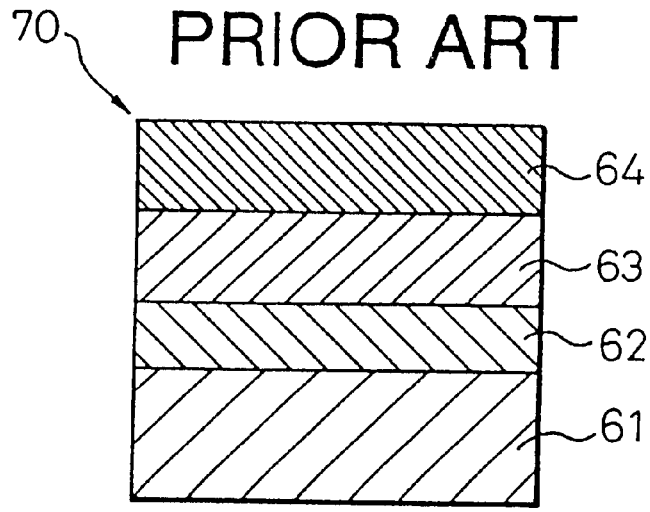
FIG. 2 is a cross-sectional view showing a layer structure of the spin valve film taken on line II—II of the spin valve head shown in FIG. 1.
Figure 3:
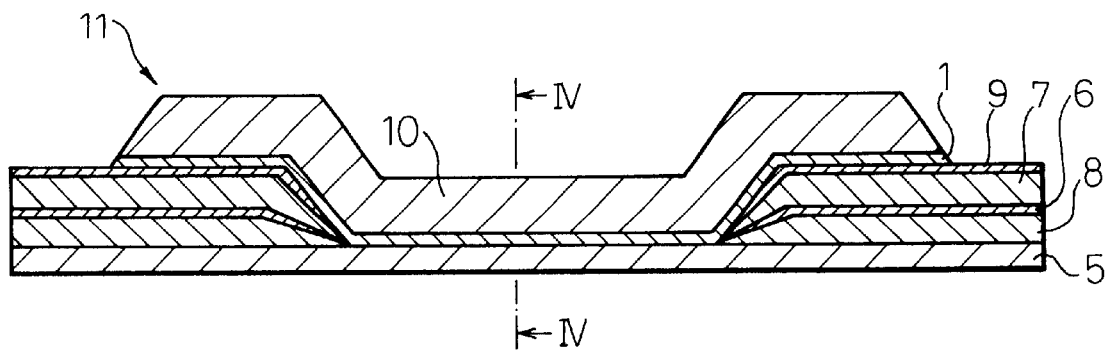
FIG. 3 is a cross-sectional view showing an embodiment of the spin valve head of the present invention.

FIG. 3 is a cross-sectional view showing an embodiment of the spin valve head of the present invention. The spin valve head 11 shown in the drawing includes a spin valve film 10, a pair of drawing electrodes 8 arranged at both ends of the spin valve film 10 at a predetermined intervals and a pair of exchange bias magnetic field impressing layers 7 arranged at both ends of the free magnetic layer, which will be explained later referring to FIG. 4, of the spin valve film 10 at a predetermined interval. In this case, the drawing electrodes 8 are electrically joined to the spin valve film 10 so as to define a signal detecting region which is also referred to as sense region SA, so that a signal detecting current can be made to flow in this signal detecting region. That is, a change in the electric resistivity in the signal detecting region can be measured as a change in the voltage by these electrodes 8. The exchange bias magnetic field impressing layer 7 is magnetically exchange coupled with the free magnetic layer of the spin valve film 10 so that the exchange bias magnetic field for controlling the magnetic domain can be impressed upon the free magnetic layer.

Figure 4:
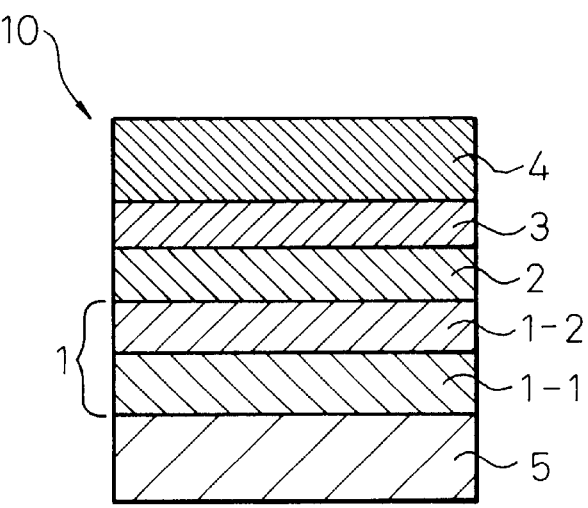
FIG. 4 is a cross-sectional view taken on line IV—IV of the spin valve head shown in FIG. 3.

In the spin valve head 11 of the present invention, it is possible to modify the spin valve film 10 within the scope of the present invention. However, usually, as shown in FIG. 4 which is a cross-sectional view taken on line IV—IV in FIG. 3, on the underlayer 5, there are successively provided a free magnetic layer 1, nonmagnetic intermediate layer 2, pinned magnetic layer 3 and regular antiferromagnetic layer 4 which are laminated in this order. The free magnetic layer 1 may be composed of a single magnetic layer. However, it is preferred that the free magnetic layer 1 is composed of the multiple layer structure including the first magnetic layer 1-1 and the second magnetic layer 1-2 as shown in the drawing. Although other base boards may be adopted if necessary, the above spin valve film 10 is usually formed on an altic-made base board, that is, on the base board composed in such a manner that an alumina film is formed on the surface of a base board made of TiC.

In the spin valve head 11 of the present invention, in order to increase an area of a portion in which the magnetic exchange connection is caused between the spin valve film 10 and the exchange bias magnetic field impressing layer 7, the exchange bias magnetic field impressing layer 7 is made of antiferromagnetic material, and further, as shown in FIG. 3, the spin valve film 10 is extended over a region which is occupied by the exchange bias magnetic field impressing layer 7. In this connection, in the valve head 11 shown in FIG. 3, a pair of electrodes 8 are formed below the exchange bias magnetic field impressing layer 7.

Figure 5:
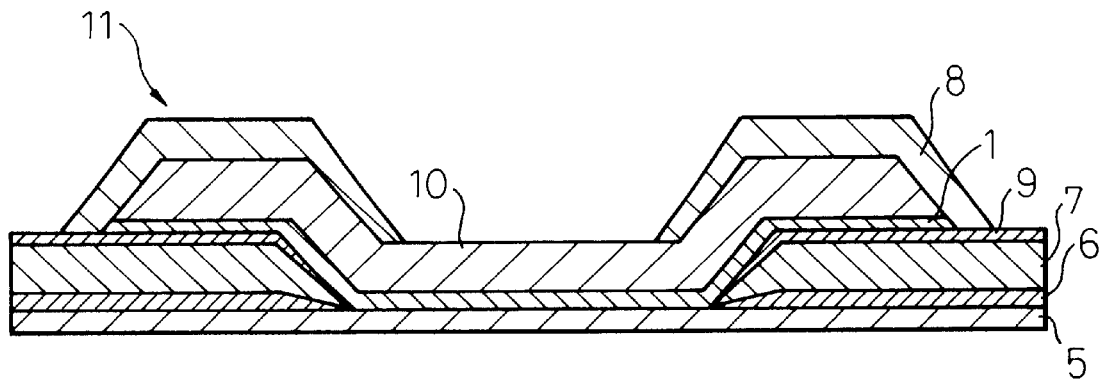
FIG. 5 is a cross-sectional view showing another embodiment of the spin valve head of the present invention.

In the spin head valve of the present invention, a pair of drawing electrodes may be formed on the exchange bias magnetic field impressing layer. FIG. 5 is a view showing such a structure. In this structure, the electrode 8 formed on the uppermost layer of the spin valve head 11 covers the exchange bias magnetic field impressing layer 7. In this connection, the lamination structure of the spin valve film 10 shown in FIG. 5 is the same as that of the spin valve film explained before referring to FIG. 4.

Then, the respective components of the spin valve head of the present invention will be further explained below.

The spin valve film has as an underlayer a Ta film and the like. As explained before, Ta-film is effective for giving an excellent crystallization to the free magnetic layer. Therefore, Ta film is most effective as the underlayer. Ta film and other type of underlayers are usually formed by a conventional film forming method such as a sputtering method, vapor-deposition method and chemical vapor phase deposition method (CVD method). The film thickness of the underlayer can be widely varied according to the effect to be desired, however, the film thickness of the underlayer is usually in a range from 2 to 10 nm. Usually, the film thickness of Ta film is about 5 nm.

The free magnetic layer may be made of any soft magnetic material. For example, CoFe alloy may be used which is commonly used for forming the free magnetic layer. Although the spin valve film of the present invention is not limited to this specific embodiment, it is preferred that the free magnetic layer is made of alloy of $(Co_yFe_{100-y})_{100-x}Z_x$, the structure of which is a face centered cubic lattice. In this formula, Z represents an arbitrary element except for Co and Fe. It is preferable that Z is boron (B) or carbon (C), and x and y each represents an atomic fraction at %. Due to the foregoing, it is possible to provide a spin valve head of high output, high magnetic field sensitivity and high heat resistance. More preferably the free magnetic layer is made of CoFeB alloy, wherein the content of Co is approximately 85 to 95 at %, and the content of B is lower than about 10 at %.

In the practice of the present invention, it is more preferable to provide a free magnetic layer composed of two layers rather than a free magnetic layer composed of a single layer as explained before referring to FIG. 4 from the viewpoint of the obtained characteristic. In the case of the free magnetic layer composed of two layers, the first free magnetic layer coming into contact with the underlayer is preferably made of alloy at least containing Ni and Fe. More preferably, the first free magnetic layer coming into contact with the underlayer is made of alloy of NiFe. The second free magnetic layer coming into contact with the nonmagnetic intermediate layer is preferably made of an alloy of CoFeZ. More preferably, the second free magnetic layer coming into contact with the nonmagnetic intermediate layer is made of CoFeB.

The respective layers constituting the free magnetic layer are usually formed by a conventional film forming method such as a sputtering method, vapor-deposition method and CVD method. The film thickness of the free magnetic layer (in the case of a multiple layer structure, the total thickness) can be changed in a wide range according to the effect to be expected. However, in order to provide a barrier function for the nonmagnetic layer provided above the free magnetic layer, it is necessary that the film thickness of the free magnetic layer is at least 3 nm. The film thickness of the free magnetic layer is usually in a range from about 3 to 20 nm. For example, it is possible to form a free magnetic layer by NiFe film of 3.5 nm thickness and CoFeB film of 4 nm thickness.

In the spin valve film of the present invention, a sandwich structure is adopted in which the nonmagnetic intermediate layer is interposed between the above free magnetic layer and the pinned magnetic layer described later. The nonmagnetic intermediate layer is usually made of nonmagnetic metallic material such as copper (Cu). In the present invention, Cu film is especially used as the nonmagnetic intermediate layer. The intermediate layer of Cu is usually formed by a conventional film forming method such as a sputtering method, vapor-deposition method and CVD method. The film thickness of the intermediate layer of Cu can be changed in a wide range according to the effect to be expected. However, the film thickness of the intermediate layer is usually in a range from about 2.5 to 6 nm. Usually, the intermediate layer of Cu, the film thickness of which is approximately 3 nm, is used.

In the same manner as the formation of the free magnetic layer, the pinned magnetic layer can be made of arbitrary soft magnetic material. That is, the pinned magnetic layer may be made of CoFe alloy. However, it is preferable that the pinned magnetic layer is made of alloy of $(Co_yFe_{100-y})_{100-x}Z_x$, the structure of which is a face centered cubic lattice. In this formula, Z represents an arbitrary element except for Co and Fe. It is preferable that Z is boron (B) or carbon (C), and x and y each represents an atomic fraction at %. Due to the foregoing, it is possible to provide a spin valve head of high output, high magnetic field sensitivity and high heat resistance. It is preferable that the pinned magnetic layer is made of CoFeB alloy, wherein the content of Co is approximately 85 to 95 at %, and the content of B is lower than about 10 at %.

The pinned magnetic layer is usually formed by a conventional film forming method such as a sputtering method, vapor-deposition method and CVD method. The film thickness of the pinned magnetic layer may be changed in a wide range according to the effect to be expected, however, it is necessary that the film thickness of the pinned magnetic layer is at least 3 nm. The film thickness of the pinned magnetic layer is usually in a range from about 3 to 20 nm.

On the pinned magnetic layer, there is provided a regular antiferromagnetic layer. This antiferromagnetic layer is usually composed of a film of FeMn, NiMn, PtMn, PdMn, PdPtMn, CrMn or IrMn. A film of PdPtMn is most useful. The antiferromagnetic layer can be formed by a conventional film forming method such as a sputtering method, vapor-deposition method or CVD method, as in the formation of the above layers. The film thickness of the antiferromagnetic layer can be changed in a wide range according to the desired effect, however, it is usually in a range from about 10 to 50 nm. In general, it is preferably that the thickness of the antiferromagnetic layer is approximately 25 nm.

Although not shown in FIG. 4, it is possible to provide a cap layer on the uppermost layer of the spin valve film 10. The cap layer can be composed of Ta film, the film thickness of which is 10 nm. In the same manner as that of each layer described above, the cap layer can be formed by the conventional film forming method.

Referring again to FIGS. 3 and 5, in the spin valve head 11 of the present invention, there are provided a pair of drawing electrodes 8 at both ends of the spin valve film 10. In the same manner as that of a general-purpose spin valve head, this drawing electrode can be composed of a film of Au, Ta or W. Especially, it is preferable to compose the drawing electrode from a film of Au, because the specific resistance of the film of Au is low, so that the resistance of the drawing electrode can be reduced.

The Au film and other electrode films can be usually formed by a conventional film forming method such as a sputtering method, vapor-deposition method and CVD method. The thickness of the electrode film can be changed in a wide range according to a site in which the electrode film is formed and also according to a desired effect. However, usually, the thickness of the electrode film is in a range from about 10 to 100 nm. In general, it is preferable that the thickness of the electrode film is approximately 50 nm.

In the spin valve head 11 of the present invention, at both ends of the free magnetic layer 1 of the spin valve film, there are provided a pair of exchange bias magnetic field impressing layers 7 so that an end portion of the spin valve film can extend over the exchange bias magnetic field impressing layer. This exchange bias magnetic field impressing layer is usually made of regular or irregular antiferromagnetic material. Examples of the regular antiferromagnetic materials effective for forming the exchange bias magnetic field impressing layer include, but are not limited to, PtMn, PdPtMn, NiMn, CrMn and CrPtMn. Similarly, examples of the irregular antiferromagnetic material effective for forming the exchange bias magnetic field impressing layer include, but are not limited to, RuMn, RuRhMn, IrMn, IrRhMn and IrRuMn.

Usually, the above exchange bias magnetic field impressing layer is used as a single layer, however, if necessary, it may be used as two or more layers. Examples of the appropriate film forming methods are a sputtering method, vapor-deposition method and CVD method which are conventional film forming methods. The film thickness of the exchange bias magnetic field impressing layer can be changed in a wide range according to a site and pattern in which it is formed, and also according to a desired effect. Generally, the film thickness of the exchange bias magnetic field impressing layer is in a range from about 5 to 30 nm, and preferably approximately 15 nm.

In the spin valve head 11 of the present invention, it is preferred to provide an underlayer 6 made of alloy of Ta/NiFe below the aforementioned exchange bias magnetic field impressing layer. The underlayer of NiFe alloy is not, however, limited to preferable examples of the underlayer of NiFe alloy are films of NiFe, NiFeCr, NiFeNb and NiFeMo. These underlayers can be formed by a sputtering method, vapor-deposition method and CVD method which are conventional film forming methods. The film thickness is usually in a range from about 1 to 3 nm.

Referring again to FIGS. 3 and 5, a preferred method of manufacturing the spin head valve of the present invention will be explained below.

In the spin valve head 11 shown in FIG. 3, on the Ta underlayer 5 which has already been formed, in a portion except for the magnetism sensing section in the signal detecting region, the following layers are successively formed via the electrode 8 of Au by the lift-off method or the ion milling method.

Underlayer 6 (film of Ta/NiFe alloy, alloy of Ta/NiFe: NiFe, NiFeCr, NiFeNb, and NiFeMo)

Exchange bias magnetic field impressing layer 7 (film of regular antiferromagnetic material such as PtMn, PdPtMn, NiMn, CrMn or CrPtMn, or film of irregular antiferromagnetic material such as RuMn, RuRhMn, IrMn, IrRhMn or IrRuMn)

Underlayer 9 (film of NiFe alloy)

Next, the uppermost surfaces of the Ta underlayer 5 and the NiFe underlayer 9 are subjected to cleaning by a sputter etching method or an ion milling method so that a contaminated layer existing on the surfaces can be completely removed.

After the completion of the cleaning process, the free magnetic layer 1 (1-1 and 1-2), nonmagnetic intermediate layer 2, pinned magnetic layer 3 and regular antiferromagnetic layer 4 are successively formed according to the layer composition shown in FIG. 4. In this way, the formation of the spin valve film 10 is completed. Each layer is formed by the sputtering method, vapor-deposition method or CVD method. In this case, as shown in FIG. 3, the spin valve film 10 is formed so that it can extend outside a portion which becomes the magnetism sensing section in the signal detecting region, that is, so that it can cover the exchange bias magnetic field impressing layer 7 formed in the previous process. In order to obtain the spin valve film 10 of a predetermined pattern, after the spin valve film 10 has been formed on the entire exchange bias magnetic field impressing layer 7, a layer of resist is formed into a predetermined pattern, and then the spin valve film formed in a region except for a necessary region is removed by the ion milling method. In this way, the spin valve head 11 shown in FIG. 3 can be obtained.

The structure of the spin valve head 11 shown in FIG. 5 is essentially the same as that of the spin valve head 11 shown in FIG. 3 except for one the different point at which a pair of electrodes 8 are formed on the exchange bias magnetic field impressing layer 7. Therefore, the spin valve head 11 shown in FIG. 5 can be manufactured by the same method as that described before.

On the Ta underlayer 5 which has already been formed, the following layers are successively formed in a portion except for the magnetism sensing section in the signal detecting region by the lift-off method or the ion milling method.

Underlayer 6 (film of Ta/NiFe alloy, alloy of Ta/NiFe: NiFe, NiFeCr, NiFeNb, and NiFeMo)

Exchange bias magnetic field impressing layer 7 (film of regular antiferromagnetic material such as PtMn, PdPtMn, NiMn, CrMn or CrPtMn, or film of irregular antiferromagnetic material such as RuMn, RuRhMn, IrMn, IrRhMn or IrRuMn)

Underlayer 9 (film of NiFe alloy)

Next, the uppermost surfaces of the Ta underlayer 5 and the NiFe underlayer 9 are subjected to cleaning by a sputter etching method or an ion milling method so that a contaminated layer existing on the surfaces can be completely removed.

After the completion of the cleaning process, the free magnetic layer 1 (1-1 and 1-2), nonmagnetic intermediate layer 2, pinned magnetic layer 3 and regular antiferromagnetic layer 4 are successively formed according to the layer composition shown in FIG. 4. In this way, the formation of the spin valve film 10 is completed. Each layer is formed by the sputtering method, vapor-deposition method or CVD method. In this case, as shown in FIG. 5, the spin valve film 10 is formed so that it can extend outside a portion which becomes the magnetism sensing section in the signal detecting region, that is, so that it can cover the exchange bias magnetic field impressing layer 7 formed in the previous process. In order to obtain the spin valve film 10 of a predetermined pattern, after the spin valve film 10 has been formed on the entire exchange bias magnetic field impressing layer 7, a layer of resist is formed into a predetermined pattern, and then the spin valve film formed in a region except for a necessary region is removed by an ion milling method.

After the spin valve film 10 has been formed, a pair of electrodes 8 are formed in a portion except for the magnetism sensing section of the signal detecting region. It is preferable that the electrodes are formed by lifting off the Au film. Although the interval of the electrodes 8 is the same as that of the exchange bias magnetic field impressing layers 7, it is preferred that the interval of the electrodes 8 is smaller than that of the exchange bias magnetic field impressing layers 7. The electrode material is not limited to Au, but other conventional electrode materials may be used if necessary. In this way, the spin valve head 11 shown in FIG. 5 can be obtained.

In the spin valve head of the present invention, for example, in the case where the exchange bias magnetic field impressing layers are composed of regular antiferromagnetic films of PtMn, PdPtMn, NiMn, CrMn or CrPtMn, after the antiferromagnetic films and the underlayer of NiFe, which is provided on the antiferromagnetic films, have been formed, a magnetic field is impressed in the direction of the signal detecting region width, and heat treatment is conducted at a temperature not lower than 230° C. so that the antiferromagnetic film can be regularized. After that, the spin valve film is formed, and a magnetic field is impressed in a direction perpendicular to the direction of the signal detecting region width, and then heat treatment is conducted at a temperature not lower than 230° C. so that the spin valve film can be regularized. Successively, heat treatment is conducted without impressing any magnetic field. Usually, this heat treatment is conducted at a temperature not lower than 230° C. When a series of heat treatments are conducted as described above, the direction of magnetization of the free magnetic layer of the spin valve layer joined to the antiferromagnetic film used for impressing the exchange bias magnetic field can be made to be perpendicular to the direction of magnetization of the free magnetic layer of the signal detecting region of the spin valve film. If necessary, magnetization may be conducted as follows. Before heat treatment is conducted without impressing any magnetic field, a magnetic field is impressed in the direction of the signal detecting region width at a temperature not higher than the temperature of heat treatment conducted for regularization, so that the direction of magnetization of the free magnetic layer joined to the antiferromagnetic film used for impressing the exchange bias magnetic field can be set at the direction of the signal detecting region width. Further, heat treatment conducted without impressing any magnetic field may be conducted together with heat treatment to form a resist insulating film of the recording head.

For example, in the case where the exchange bias magnetic field impressing layer is composed of an irregular antiferromagnetic film of RuMn, RuRhMn, IrMn, IrRhMn or IrRuMn, after the spin valve film has been formed, a magnetic field is impressed in the direction perpendicular to the direction of the signal detecting region width of the spin valve film, and heat treatment is conducted at a temperature not lower than 230° C. so that the antiferromagnetic film of the spin valve film can be regularized. After than, a magnetic field is impressed in the direction of the signal detecting region width, so that the direction of magnetization of the free magnetic layer of the spin valve film can be set in the direction of the signal detecting region width, and then heat treatment is conducted at a temperature not lower than Neel temperature of the antiferromagnetic film used for impressing the exchange bias magnetic field. When a series of heat treatments are conducted as described above, the direction of magnetization of the free magnetic layer of the spin valve layer joined to the antiferromagnetic film used for impressing the exchange bias magnetic field can be made to be perpendicular to the direction of magnetization of the free magnetic layer of the signal detecting region of the spin valve film.

When the direction of magnetization of the free magnetic layer joined to the exchange bias magnetic field impressing layer is made to be perpendicular to the direction of magnetization of the free magnetic layer of the signal detecting region of the spin valve film, it is possible to increase an area of a portion in which the exchange bias magnetic field impressing layer and the free magnetic layer of the spin vale film directly come into contact with each other and are laminated on each other. Due to the foregoing, the free magnetic layer of the spin valve film and the exchange bias magnetic field impressing layer can be more stably magnetically connected with each other, and Barkhausen noise can be effectively controlled.

The spin valve head of the present invention can be advantageously used when it is incorporated into a magnetic disk device or other magnetic reproducing devices such as a magnetic tape device.

Referring to FIGS. 6 to 9, an embodiment of a magnetic disk device having the spin valve head of the present invention will be explained below.

Figure 6:
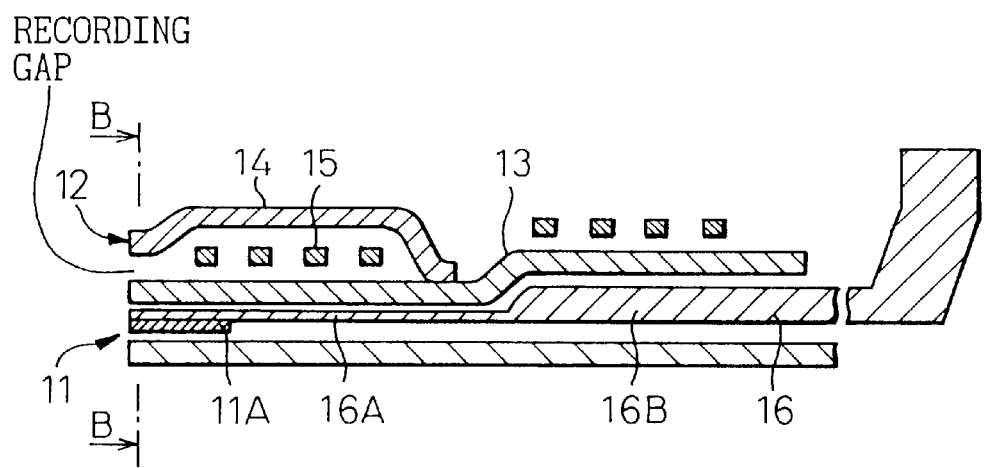
FIG. 6 is a cross-sectional view showing the principle of the magnetic disk device of the present invention.
Figure 7:
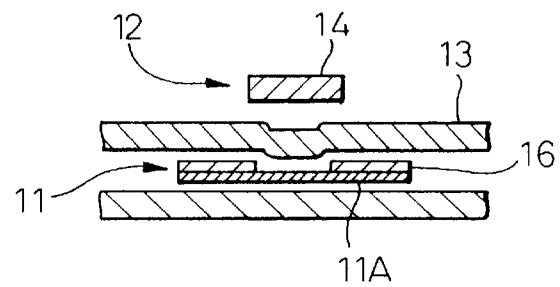
FIG. 7 is a cross-sectional view taken on line B—B of the magnetic disk device shown in FIG. 6.

In the magnetic disk device of the present invention, for example, the recording head section and reproducing head section can be composed of a lamination structure shown in FIGS. 6 and 7. FIG. 6 is a view showing the principle of the magnetic disk device of the present invention. FIG. 7 is a cross-sectional view taken on line B—B in FIG. 6.

In FIGS. 6 and 7, reference numeral 12 is an induction type recording head section to record information into a magnetic recording medium (for example, a magnetic disk, not shown), and reference numeral 11 is a magneto-resistive effect type reproducing head section to read out information, which corresponds to the spin valve head of the present invention. The recording head section 12 includes a lower magnetic pole (upper shield layer) 13 of NiFe, an upper magnetic pole 14 of NiFe which is opposed to the lower magnetic pole 13 leaving a predetermined interval, and a coil 15 to excite these magnetic poles 13 and 14 so that information can be recorded in a magnetic recording medium.

On the magneto-resistive effect element section 11A of the reproducing head section (spin valve head) 11, there are provided a pair of conductor layers 16 for supplying a sensing current to the magneto-resistive effect element section 11A at an interval corresponding to the width of recording track. In this case, the film thickness of the conductor layer 16 is small in a portion 16A close to the magneto-resistive effect element section 11A, and the film thickness of other portion 16B is large.

In the structure shown in FIGS. 6 and 7, the film thickness of the conductor layer 16 in the portion 16A close to the magneto-resistive effect element section 11A is small. Therefore, the bend of the lower magnetic pole (upper shield layer) 13 is small. Therefore, the shape of the recording gap opposed to the magnetic recording medium is not bent very much. Accordingly, even if a small slippage is caused between the position of the magnetic head on the track in the case of recording information and the position of the magnetic head on the track in the case of reading out information, the magnetic disk device can accurately read out information. Therefore, it is possible to avoid the occurrence of such a situation that errors are caused in reading information although the off-track error is small.

On the other hand, the film thickness of the conductor layer 16 in the portion 16B except for the portion close to the magneto-resistive effect element section 11A is large. Therefore, the entire resistance of the conductor layer 16 can be reduced. As a result, a change in the resistance of the magneto-resistive element section 11A can be detected with high sensitivity. Accordingly, S/N ratio can be enhanced, and the conductor layer 16 can be prevented from heating. Therefore, the generation of noise caused upon heating can be prevented.

Figure 8:
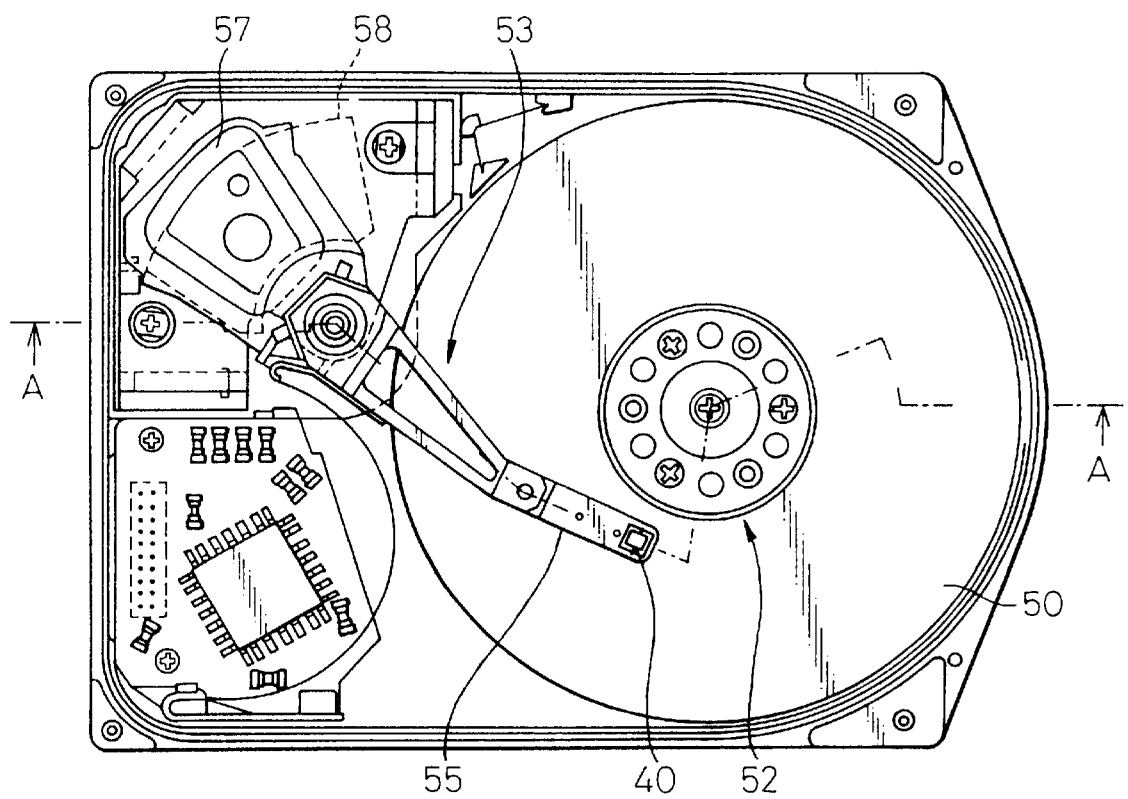
FIG. 8 is a plan view showing an embodiment of the magnetic disk device of the present invention.
Figure 9:
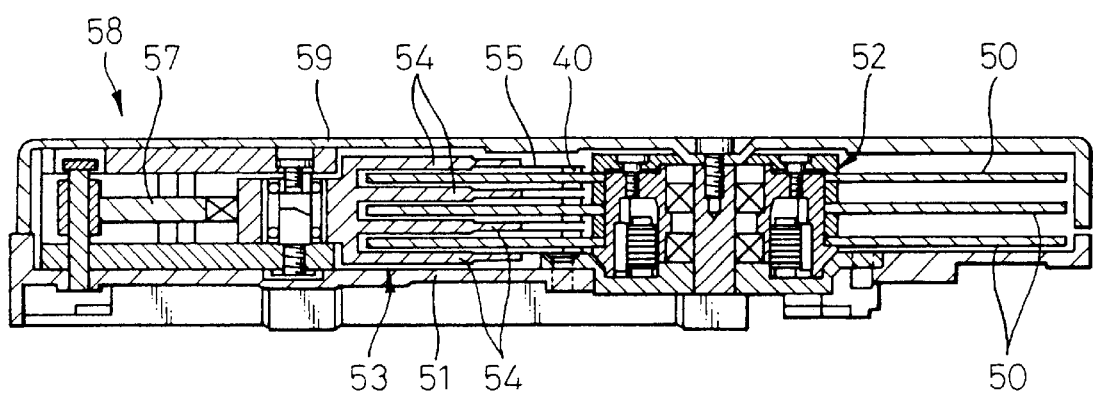
FIG. 9 is a cross-sectional view taken on line A—A of the magnetic disk device shown in FIG. 8.

The magnetic disk device of the present invention can be constituted as shown in FIGS. 8 and 9. FIG. 8 is a plan view of the magnetic disk device, the cover of which is removed in this drawing, and FIG. 9 is a cross-sectional view taken on line A—A in FIG. 8.

In these drawings, reference numeral 50 is a plurality of magnetic disks (three magnetic disks are shown in the drawings), i.e., a magnetic recording medium, rotated by the spindle motor 52 arranged on the base plate 51.

Reference numeral 53 is an actuator pivotally arranged on the base plate 51. At one rotary end portion of this actuator 53, there are provided a plurality of head arms 54 extending in the direction of the recording face of the magnetic disk 50. At the rotary end portion of this head arm 54, there is provided a spring arm 55. Further, at the flexure portion of this spring arm 55, there is provided a slider 40 having the aforementioned spin valve head. This slider 40 is tiltably attached to the flexure portion of this spring arm 55 via an insulating film not shown. On the other hand, at the other rotary end portion of the actuator 53, there is provided a coil 57.

On the base plate 51, there is provided a magnetic circuit 58 composed of a magnet and yoke. In the magnetic gap of this magnetic circuit 58, the above coil 57 is arranged. The magnetic circuit 58 and the coil 57 compose a moving coil type linear motor (VCM: voice coil motor). The upper portion of this base plate 51 is covered with the cover 59.

Next, operation of the above magnetic disk device will be explained below. When the magnetic disk 50 stops, the slider 40 also stops coming into contact with a retracting zone of the magnetic disk 50.

Next, when the magnetic disk 50 is rotated at high speed by the spindle motor 52, an air current is created by the rotation of the magnetic disk 50, and the slider 40 is made to float close to the disk surface. When an electric current is made to flow in the coil 57 under the above condition, a thrust is generated in the coil 57 so that the actuator 53 is rotated. Due to the foregoing, it is possible to move the spin valve head (slider 40) onto a desired track on the magnetic disk 50, and reading/writing can be conducted.

In this magnetic disk device, the thickness of the portion of the magnetic head conductor layer close to the magneto-resistive effect element section is small, and the thickness of other portion is large. Therefore, the flexure of the magnetic pole in the recording head section can be decreased, and at the same time the resistance of the conductor layer is decreased. Accordingly, if the off-track error is small, information can be accurately and highly sensitively read out.

EXAMPLES

The present invention will be further described with reference to the examples thereof. In this connection, it should be note that the present invention is not limited to the following specific examples.

Example 1

In this example, a spin valve head having the structure explained before referring to FIG. 3 was manufactured. As the exchange bias magnetic field impressing layer, a regular antiferromagnetic film of PtMn was used.

On an altic base board, Ta was deposited at the film thickness of 5 nm by the sputtering method to form a Ta underlayer. Then, in order to form an electrode layer, Au was deposited in a portion except for the magnetism sensing section of the signal detecting region of the spin valve film at the film thickness of 50 nm by the sputtering method. Successively, the following layers were formed on the Au electrode in the described order.

Underlayer of Ta/NiFe alloy of 5 nm thickness;

Exchange bias magnetic field impressing layer of PtMn alloy of 20 nm thickness; and Underlayer of NiFe alloy of 5 nm thickness.

After the exchange bias magnetic field impressing layer and others were formed as described above, a magnetic field was impressed in the direction of the width of the signal detecting region, and heat treatment was conducted at about 250° C. By this heat treatment, regularization of the exchange bias magnetic field impressing layer was completed. Next, the uppermost surfaces of underlayers of Ta and NiFe were cleaned by a sputter-etching method so as to remove the contaminated layer.

After the completion of the cleaning process, the process was transferred to the formation of the spin valve film. The spin valve film was formed so that the spin valve film could extend to the outside of a portion which became the magnetism sensing section of the signal detecting region, that is, the spin valve film was formed so that the spin valve film could cover the exchange bias magnetic field impressing layer formed in the previous process.

NiFe and CoFeB were respectively deposited by the sputtering method, so that the free magnetic layer was composed of a NiFe film of 3.5 nm thickness and a CoFeB film of 4 nm thickness. On the free magnetic layer, the nonmagnetic intermediate layer of Cu of 3.2 nm thickness was formed by the sputtering method, and also the pinned magnetic layer of CoFeB of 3 nm thickness was formed. The regular antiferromagnetic layer of PdPtMn of 25 nm thickness was formed on the pinned magnetic layer by the sputtering method. The cap layer was formed on the regular antiferromagnetic layer by depositing Ta at the thickness of 10 nm by the sputtering method. After the spin valve film was formed on the entire exchange bias magnetic field impressing layer in the above series of processes, the surface was selectively coated with resist, and the spin valve film in a region except for a predetermined region was removed by the ion milling method.

Successively, while a magnetic field was being impressed upon the thus obtained spin valve film in the direction perpendicular to the direction of the width of the signal detecting region, heat treatment was conducted at about 250° C. Successively, heat treatment was also conducted at about 250° C. under the condition of no magnetic field. Due to the above heat treatment, regularization of the antiferromagnetic layer of the spin valve film was completed.

Example 2

In this example, a spin valve head having the structure explained referring to FIG. 5 was manufactured. As the exchange bias magnetic field impressing layer, an irregular antimagnetic film of RuMn was used.

On an altic base board, Ta was deposited at the film thickness of 5 nm by the sputtering method to form a Ta underlayer. The following layers were successively formed on the Ta underlayer.

Underlayer of Ta/NiFe alloy of 5 nm thickness;
Exchange bias magnetic field impressing layer of RuMn alloy of 10 nm thickness; and
Underlayer of NiFe alloy of 5 nm thickness.

The uppermost surfaces of underlayers of Ta and NiFe were cleaned by a sputter-etching method to remove the contaminated layer.

After the completion of the cleaning process, the process was transferred to the formation of the spin valve film. The spin valve film was formed so that the spin valve film could extend to the outside of a portion which became the magnetism sensing section of the signal detecting region, that is, the spin valve film was formed so that the spin valve film could cover the exchange bias magnetic field impressing layer formed in the previous process.

NiFe and CoFeB were respectively deposited by the sputtering method, so that the free magnetic layer was composed of a NiFe film of 3.5 nm thickness and a CoFeB film of 4 nm thickness. On the free magnetic layer, the nonmagnetic intermediate layer of Cu of 3.2 nm thickness was formed by the sputtering method, and also the pinned magnetic layer of CoFeB of 3 nm thickness was formed. The regular antiferromagnetic layer of PdPtMn of 25 nm thickness was formed on the pinned magnetic layer by the sputtering method. The cap layer was formed on the regular antiferromagnetic layer by depositing Ta at the thickness of 10 nm by the sputtering method. After the spin valve film was formed on the entire exchange bias magnetic field impressing layer in the above series of processes, the surface was selectively coated with resist, and the spin valve film in a region except for a predetermined region was removed by the ion milling method.

Successively, while a magnetic field was being impressed upon the thus obtained spin valve film in the direction perpendicular to the direction of the width of the signal detecting region, heat treatment was conducted at about 250° C. Due to the above heat treatment, regularization of the antiferromagnetic layer of the spin valve film was completed. Thereafter, a magnetic field was impressed in the direction perpendicular to the width of the signal detecting region of the spin valve film, so that the direction of magnetization of the free magnetic layer of the spin valve film could be arranged to be the same as the direction of the width of the signal detecting region. Heat treatment was conducted at a temperature (about 280° C.) not lower than Neel temperature of the exchange bias magnetic field impressing layer.

Due to the above heat treatment, the direction of magnetization of the free magnetic layer joined to the exchange bias magnetic field impressing layer and the direction of magnetization of the free magnetic layer (signal detecting region) of the spin valve film became perpendicular to each other.

Finally, in order to form the electrode layer, Au was deposited on the spin valve film at the thickness of 50 nm by the sputtering method. Then, only a Au film in the magnetism sensing section in the signal detecting region was selectively removed by the lift-off method.

As described above, in the spin valve head of the present invention, it is possible to remarkably increase an area in which the exchange bias magnetic field impressing layer, which is arranged so as to suppress Barkhausen noise of the spin valve head, and the free magnetic layer are magnetically exchange coupled. Therefore, more stable magnetic exchange coupling can be accomplished. As a result, it is possible to provide a spin valve head in which magnetic domain control can be more stably conducted on the free magnetic layer, and the generation of Barkhausen noise can be suppressed.

According to the present invention, the abutted junction region can be stably formed without being affected by the processes of forming a spin valve film and a hard magnetic thin film. Therefore, reliability of the magnetic exchange coupling can be enhanced, and deterioration of the magnetic field sensitivity at both ends of the signal detecting region can be prevented.

According to the present invention, it is possible to easily manufacture an excellent spin valve head of the present invention.

According to the present invention, it is possible to provide a magnetic disk device of high performance, and other magnetic recording and reproducing machines, into which the spin valve head of the present invention is incorporated.

What is claimed is:

1. A spin valve head which comprises:
   a spin valve film comprising a regular antiferromagnetic layer, pinned magnetic layer, intermediate layer and free magnetic layer;
   a pair of electrodes arranged at both ends of the spin valve film, electrically connected with the spin valve film so as to define a signal detection region and apply a signal detection current flow to the signal detection region; and
   a pair of exchange bias magnetic field impressing layers arranged at both ends of the free magnetic layer of the spin valve film and magnetically exchange coupled with the free magnetic layer so as to impress an exchange bias magnetic field for controlling a magnetic domain upon the free magnetic layer,
   wherein the exchange bias magnetic field impressing layers are made of antiferromagnetic material, and the spin valve film extends over the pair of exchange bias magnetic field impressing layers.

2. A spin valve head according to claim 1, wherein the pair of electrodes are formed below the exchange bias magnetic field impressing layers.

3. A spin valve head according to claim 1, wherein the pair of electrodes are formed above the exchange bias magnetic field impressing layers.

4. A spin valve head according to claim 1, wherein the spin valve film has an underlayer composed of Ta film in the signal detecting region.

5. A spin valve head according to claim 1, wherein the pair of electrodes are made of Au.

6. A spin valve head according to claim 1, wherein the exchange bias magnetic field impressing layers are composed of regular antiferromagnetic films.

7. A spin valve head according to claim 6, wherein the regular antiferromagnetic film is composed of a film made of PtMn, PdPtMn, NiMn, CrMn or CrPtMn, or a composite film thereof.

8. A spin valve head according to claim 7, wherein the regular antiferromagnetic film has an underlayer made of Ta/NiFe alloy.

9. A spin valve head according to claim 8, wherein the underlayer of NiFe alloy is a film made of NiFe, NiFeCr, NiFeNb or NiFeMo.

10. A spin valve head according to claim 1, wherein the exchange bias magnetic field impressing layers are composed of irregular antiferromagnetic films.

11. A spin valve head according to claim 10, wherein the irregular antiferromagnetic film is composed of a film made of RuMn, RuRhMn, IrMn, IrRhMn, IrRuMn or a composite film thereof.

12. A spin valve head according to claim 11, wherein the irregular antiferromagnetic film has an underlayer made of Ta/NiFe alloy.

13. A spin valve head according to claim 12, wherein the underlayer of NiFe alloy is a film made of NiFe, NiFeCr, NiFeNb or NiFeMo.

14. A method of manufacturing a spin valve head, the spin valve head comprising:
- a spin valve film comprising a regular antiferromagnetic layer, pinned magnetic layer, intermediate layer and free magnetic layer;
- a pair of electrodes arranged at both ends of the spin valve film, electrically connected with the spin valve film so as to define a signal detection region and apply a signal detection current flow to the signal detection region; and
- a pair of exchange bias magnetic field impressing layers arranged at both ends of the free magnetic layer of the spin valve film and magnetically exchanged coupled with the free magnetic layer so as to impress an exchange bias magnetic field for controlling a magnetic domain upon the free magnetic layer, in which said method comprises the steps of:
- making the exchange bias magnetic field impressing layers of antiferromagnetic material; and
- extending the spin valve film over the pair of exchange bias magnetic field impressing layers.

15. A method of manufacturing a spin valve head according to claim 14, wherein the free magnetic layer is formed so that the magnetization of the free magnetic layer joined to the exchange bias magnetic field impressing layer and the magnetization of the free magnetic layer in the signal detecting region can be perpendicular to each other.

16. A method of manufacturing a spin valve head according to claim 15 in which the exchange bias magnetic field impressing layer is composed of a regular antiferromagnetic film, and said method further comprises the steps of:
- forming a film of NiFe alloy as an underlayer after the exchange bias magnetic field impressing layer has been made of antiferromagnetic material, and regularizing the antiferromagnetic film by conducting heat treatment while a magnetic field is being impressed upon it in the direction of the width of the signal detecting region;
- regularizing the antiferromagnetic film of the spin valve film by conducting heat treatment while a magnetic field is being impressed in a direction perpendicular to the direction of the width of the signal detecting region; and
- conducting heat treatment successively under the condition of nonmagnetic field.

17. A method of manufacturing a spin valve head according to claim 16, wherein a resist insulating film of a recording head is formed in the process in which heat treatment is conducted under the condition of nonmagnetic field.

18. A method of manufacturing a spin valve head according to claim 16, wherein the intensity of the magnetic field impressed in the direction of the width of the signal detecting region is higher than that of the magnetic field impressed in the direction perpendicular to the direction of the width of the signal detecting region.

19. A method of manufacturing a spin valve head according to claim 16, wherein the heat treatment process is executed at a temperature not lower than 230° C.

20. A method of manufacturing a spin valve head according to claim 15 in which the exchange bias magnetic field impressing layer is composed of an irregular antiferromagnetic film, and said method further comprises the steps of:
- regularizing the antiferromagnetic film of the spin valve film by conducting heat treatment while a magnetic field is being impressed in the direction perpendicular to the direction of the width of the signal detecting region after the spin valve film has been formed in a predetermined order; and
- arranging the direction of magnetization of the free magnetic layer to the direction of the width of the signal detecting region by impressing a magnetic field in the direction of the width of the signal detecting region, and conducting heat treatment at a temperature not lower than Neel temperature of the antiferromagnetic material of the exchange bias magnetic field impressing layer.

21. A magnetic disk device having a spin valve head, the spin valve head comprising:
- a spin valve film containing a regular antiferromagnetic layer, a pinned magnetic layer, an intermediate layer and a free magnetic layer;
- a pair of electrodes arranged at both ends of the spin valve film and electrically connected with the spin valve film so as to define a signal detection region and apply a signal detection current flow to the signal detection region; and
- a pair of exchange bias magnetic field impressing layers arranged at both ends of the free magnetic layer of the spin valve film and magnetically exchange coupled with the free magnetic layer so as to impress an exchange bias magnetic field for controlling a magnetic domain upon the free magnetic layer,
- wherein the exchange bias magnetic field impressing layers are made of antiferromagnetic material and the spin valve film extends over the pair of exchange bias magnetic field impressing layers.

* * * * *